(12) United States Patent
Barrick et al.

(10) Patent No.: US 10,042,051 B2
(45) Date of Patent: Aug. 7, 2018

(54) COASTAL HF RADAR SYSTEM FOR TSUNAMI WARNING

(71) Applicant: CODAR Ocean Sensors, Ltd., Mountain View, CA (US)

(72) Inventors: Donald E. Barrick, Emerald Hills, CA (US); Belinda J. Lipa, Portola Valley, CA (US); James Isaacson, Austin, TX (US)

(73) Assignee: CODAR Ocean Sensors, Ltd., Mountain View, CA (US)

( * ) Notice: Subject to any disclaimer, the term of this patent is extended or adjusted under 35 U.S.C. 154(b) by 344 days.

(21) Appl. No.: 15/140,325

(22) Filed: Apr. 27, 2016

(65) Prior Publication Data
US 2017/0315232 A1   Nov. 2, 2017

(51) Int. Cl.
*G01S 13/88* (2006.01)
*G01S 13/95* (2006.01)
*G01S 7/03* (2006.01)

(52) U.S. Cl.
CPC ............. *G01S 13/951* (2013.01); *G01S 7/03* (2013.01); *G01S 13/886* (2013.01); *Y02A 90/18* (2018.01)

(58) Field of Classification Search
CPC ........ G01S 13/886; G01S 13/951; G01S 7/03; Y02A 90/18
USPC ........................................................ 342/26
See application file for complete search history.

(56) References Cited

U.S. PATENT DOCUMENTS

| 7,277,797 | B1 * | 10/2007 | Kunitsyn | ............... | G01V 1/008 |
| | | | | | 702/15 |
| 2012/0185897 | A1 * | 7/2012 | Gould | ................... | G08B 27/005 |
| | | | | | 725/33 |
| 2016/0069992 | A1 | 3/2016 | Rector et al. | | |
| 2016/0157073 | A1 * | 6/2016 | Ishikawa | ................. | H04W 4/90 |
| | | | | | 455/404.1 |

OTHER PUBLICATIONS

Barrick et al., "Sea Backscatter at HF: Interpretation and Utilization of the Echo," Proceedings of the IEEE, (Jun. 1974), 8 pages.
Barrick, "A Coastal Radar System for Tsunami Warning," Remote Sensing of Environment: An Interdisciplinary Journal, (1979), 7 pages.
Titov, et al., "Implementation and Testing of the Method of Splitting Tsunami (MOST) Model," NOAA Technical Memorandum ERL PMEL-112, Contribution No. 1927 from NOAA/Pacific Marine Environmental Laboratory, (Nov. 1997), 14 pages.
Lipa, et al., "Tsunami Arrival Detection with High Frequency (HF) Radar," Remote Sensing, Published May 18, 2012, 14 pages.

* cited by examiner

*Primary Examiner* — Timothy A Brainard
(74) *Attorney, Agent, or Firm* — Weaver Austin Villeneuve & Sampson LLP

(57) ABSTRACT

Systems and techniques are described for tsunami detection and warning using coastal radar systems designed primarily for the real-time mapping of ocean surface currents. These radar systems are configured to detect an approaching tsunami in the system's "near field," i.e., the near-shore region over which the radar system observes the sea surface.

32 Claims, 4 Drawing Sheets

COASTAL HF RADAR SYSTEM FOR TSUNAMI WARNING

BACKGROUND

Tsunamis are typically produced by either abrupt surface-floor physical displacements (e.g., subsea earthquakes or landslides) or atmospheric anomalies (e.g., the latter are called meteo-tsunamis). So the first possible indication of a tsunami might be the seismic detection of an earthquake. However, not all subsea earthquakes produce tsunamis, and hence the magnitude of an earthquake cannot be used to forecast the generation or intensity of a resulting tsunami.

One type of sensor that sees and measures the intensity of a tsunami is a bottom pressure sensor connected to a buoy overhead. Developed by the National Oceanic and Atmospheric Administration (NOAA), networks of these sensors (called DART™ for Deep-ocean Assessment and Reporting of Tsunami) were deployed after the catastrophic 2004 Banda Aceh (Indonesia) earthquake whose subsequent tsunami claimed a quarter of a million lives. DART™ sensors observe the height of the tsunami wave as it passes above them. The tsunami height measured by these buoys is then inputted to numerical tsunami models to give rough forecasts of arrival and intensity at coastal points around the world. An example of such a numerical model is described in Implementation and testing of the Method of Splitting Tsunami (MOST) model, V. Titov and F. Gonzalez, NOAA Tech. Memo. ERL PMEL-112 (PB98-122773), NOAA/Pacific Marine Environmental Laboratory, Seattle, Wash., 11 pp, (1997), the entire disclosure of which is incorporated herein by reference for all purposes.

However, the DART™ network is still sparse, so that not all tsunamis can be observed and inputted to the model before coastal impact. Furthermore, because of the wide range of variation of the bathymetry (i.e., depth of water offshore) of different coastal regions, the model's forecast of timing and intensity at the coast is often only very coarse.

SUMMARY

Systems, methods, and computer program products are described for tsunami detection and warning.

According to a class of implementations, systems, methods, and computer program products are provided in which Bragg peak information derived from receiver signals of a coastal radar system is received. The Bragg peak information represents ocean surface currents. A tsunami alert is generated from the Bragg peak information using tsunami detection logic. The tsunami detection logic is configured to detect patterns corresponding to temporal, spectral, and spatial characteristics of a tsunami. The credibility of the tsunami alert is determined using time-correlated information from one or more external sources.

According to some implementations, based on the credibility of the tsunami alert, one of the following is performed: (1) transmitting the tsunami alert to a tsunami warning center, (2) transmitting the tsunami alert to the tsunami warning center with credibility information representing the credibility of the tsunami alert, or (3) ignoring the tsunami alert.

According to some implementations, determining the credibility of the tsunami alert includes correlating the tsunami alert with one or more other tsunami alerts generated by one or more nearby coastal radar systems.

According to some implementations, determining the credibility of the tsunami alert includes correlating the tsunami alert with an arrival time window estimated using one of seismic event information, subsea landslide event information, or atmospheric anomaly event information. According to more specific implementations, the arrival time window is calculated in response to the seismic event information, the subsea landslide event information, or the atmospheric anomaly event information.

According to some implementations, determining the credibility of the tsunami alert is done with reference to a complexity of the ocean surface currents as determined from the Bragg peak information.

According to some implementations, in response to the tsunami alert, a height and an arrival time is estimated using a numerical model for near-field tsunami propagation based on offshore bathymetry for the coastal radar system.

According to some implementations, generating the tsunami alert from the Bragg peak information includes resolving radial current information derived from the Bragg peak information into a plurality of substantially rectangular bands substantially parallel to a shoreline adjacent the coastal radar system. Each of the bands is characterized by a perpendicular flow component and a parallel flow component. For each band, it is determined whether: (1) an orbital velocity associated with the band changes by more than a first amount over consecutive time intervals, (2) the orbital velocity associated with the band is within a second amount of the orbital velocity of an adjacent band, and (3) the orbital velocities associated with multiple adjacent bands including the band all change in a same direction over at least two consecutive time intervals. One or more tsunami alert values are adjusted based on the determinations for the bands, and the tsunami alert is generated if one or more of the tsunami alert values exceeds a threshold.

According to another class of implementations, systems, methods, and computer program products are provided in which receiver signals are received from one or more receivers of a coastal radar system. Doppler spectra information is generated from the receiver signals. Signal interference information is removed from the Doppler spectra information thereby generating preconditioned spectra information. Bragg peak information is extracted from the preconditioned spectra information, the Bragg peak information representing ocean surface currents. Using tsunami detection logic, a tsunami alert is generated from the Bragg peak information. The credibility of the tsunami alert is determined using stored correlations between false alert information previously generated by the tsunami detection logic and previously stored signal interference information representative of current conditions of the coastal radar system.

According to some implementations, based on the credibility of the tsunami alert, one of the following is performed: (1) transmitting the tsunami alert to a tsunami warning center, (2) transmitting the tsunami alert to the tsunami warning center with credibility information representing the credibility of the tsunami alert, or (3) ignoring the tsunami alert.

According to some implementations, the credibility of the tsunami alert is further determined by correlating the tsunami alert with one or more other tsunami alerts generated by one or more nearby coastal radar systems.

According to some implementations, the credibility of the tsunami alert is further determined by correlating the tsunami alert with an arrival time window estimated using seismic event information. According to more specific implementations, the arrival time window is calculated in response to the seismic event information.

According to some implementations, the credibility of the tsunami alert is further determined with reference to a strength and a complexity of the ocean surface currents as determined from the Bragg peak information.

According to some implementations, in response to the tsunami alert, a height and an arrival time is estimated using a numerical model for near-field tsunami propagation based on offshore bathymetry for the coastal radar system.

According to some implementations, generating the tsunami alert from the Bragg peak information includes resolving radial current information derived from the Bragg peak information into a plurality of substantially rectangular bands substantially parallel to a shoreline adjacent the coastal radar system. Each of the bands is characterized by a perpendicular flow component and a parallel flow component. For each band, it is determined whether: (1) an orbital velocity associated with the band changes by more than a first amount over consecutive time intervals, (2) the orbital velocity associated with the band is within a second amount of the orbital velocity of an adjacent band, and (3) the orbital velocities associated with multiple adjacent bands including the band all change in a same direction over at least two consecutive time intervals. One or more tsunami alert values are adjusted based on the determinations for the bands, and the tsunami alert is generated if one or more of the tsunami alert values exceeds a threshold.

According to another class of implementations, systems, methods, and computer program products are provided in which a tsunami alert is generated using tsunami detection logic. The tsunami detection logic is configured to detect patterns corresponding to temporal, spectral, and spatial characteristics of a tsunami. The credibility of the tsunami alert is determined using time-correlated information from one or more external sources.

According to some implementations, based on the credibility of the tsunami alert, one of the following is performed: (1) transmitting the tsunami alert to a tsunami warning center, (2) transmitting the tsunami alert to the tsunami warning center with credibility information representing the credibility of the tsunami alert, or (3) ignoring the tsunami alert.

According to some implementations, determining the credibility of the tsunami alert includes correlating the tsunami alert with one or more other tsunami alerts generated by one or more nearby coastal radar systems.

According to some implementations, determining the credibility of the tsunami alert includes correlating the tsunami alert with an arrival time window estimated using seismic event information. According to more specific implementations, the arrival time window is calculated in response to the seismic event information.

According to some implementations, determining the credibility of the tsunami alert is done reference to a complexity of the ocean surface currents as determined from Bragg peak information generated by a coastal radar system.

According to another class of implementations, systems, methods, and computer program products are provided in which a tsunami alert is generated using tsunami detection logic. The tsunami detection logic is configured to detect patterns corresponding to temporal, spectral, and spatial characteristics of a tsunami in signals received from a coastal radar system. The tsunami alert has a time and a distance offshore associated therewith. In response to the tsunami alert, a height and an arrival time is estimated using a numerical model for near-field tsunami propagation based on offshore bathymetry and coastline geometry for the coastal radar system.

According to some implementations, the credibility of the tsunami alert is determined using time-correlated information from one or more external sources.

According to specific ones of these implementations, based on the credibility of the tsunami alert, one of the following is performed: (1) transmitting the tsunami alert to a tsunami warning center, (2) transmitting the tsunami alert to the tsunami warning center with credibility information representing the credibility of the tsunami alert, or (3) ignoring the tsunami alert.

According to specific ones of these implementations, determining the credibility of the tsunami alert includes correlating the tsunami alert with one or more other tsunami alerts generated by one or more nearby coastal radar systems.

According to specific ones of these implementations, determining the credibility of the tsunami alert includes correlating the tsunami alert with an arrival time window estimated using seismic event information. According to more specific implementations, the arrival time window is calculated in response to the seismic event information.

According to specific ones of these implementations, determining the credibility of the tsunami alert is done reference to a complexity of the ocean surface currents as determined from Bragg peak information generated by a coastal radar system.

According to another class of implementations, systems, methods, and computer program products are provided in which Bragg peak information derived from receiver signals of a coastal radar system is received. The Bragg peak information represents ocean surface currents. A tsunami alert is generated from the Bragg peak information using tsunami detection logic. The tsunami detection logic is configured to detect patterns corresponding to temporal, spectral, and spatial characteristics of a tsunami. The credibility of the tsunami alert is determined using stored correlations between false alert information previously generated by the tsunami detection logic and previously stored signal interference information representative of current conditions of the coastal radar system.

According to some implementations, the signal interference information represents one or more of atmospheric interference, radio interference, or ocean surface current complexity.

According to some implementations, based on the credibility of the tsunami alert, one of the following is performed: (1) transmitting the tsunami alert to a tsunami warning center, (2) transmitting the tsunami alert to the tsunami warning center with credibility information representing the credibility of the tsunami alert, or (3) ignoring the tsunami alert.

According to some implementations, the credibility of the tsunami alert is further determined by correlating the tsunami alert with one or more other tsunami alerts generated by one or more nearby coastal radar systems.

According to some implementations, the credibility of the tsunami alert is further determined by correlating the tsunami alert with an arrival time window estimated using seismic event information.

According to another class of implementations, systems, methods, and computer program products are provided in which receiver signals are received from one or more receivers of a coastal radar system. Doppler spectra information is generated from the receiver signals. Signal interference information is removed from the Doppler spectra information thereby generating preconditioned spectra information. Bragg peak information is extracted from the preconditioned spectra information, the Bragg peak information representing ocean surface currents. Using tsunami detection logic, false alert information is generated from the Bragg peak information. The false alert information is correlated with known information representing actual conditions associated with the coastal radar system. A simulated tsunami representation is injected into the tsunami detection logic. The simulated tsunami representation is characterized by a plurality of tsunami parameters. A detection probability is determined for the simulated tsunami representation. The receiving, generating, removing, extracting, generating, and correlating are repeated to determine operational parameters of the coastal radar system and the tsunami detection logic. The injecting and determining are repeated for a plurality of simulated tsunami representations characterized by different sets of the tsunami parameters to further determine the operational parameters of the coastal radar system and the tsunami detection logic.

According to some implementations, correlating the false alert information with the known information includes correlating the false alert information with the at least some of the signal interference information. According to more specific implementations, the signal interference information represents one or both of atmospheric interference, or radio interference.

According to some implementations, removing the signal interference information includes removing one or both of portions of Doppler stripes that occur over multiple ranges, or short-time impulsive interference.

According to some implementations, the simulated tsunami representation is generated using a numerical model for near-field tsunami propagation based on offshore bathymetry for the coastal radar system.

According to some implementations, correlating the false alert information with the known information includes correlating the false alert information with background surface current information derived from the Bragg peak information.

A further understanding of the nature and advantages of various implementations may be realized by reference to the remaining portions of the specification and the drawings.

DETAILED DESCRIPTION

Figure 1:
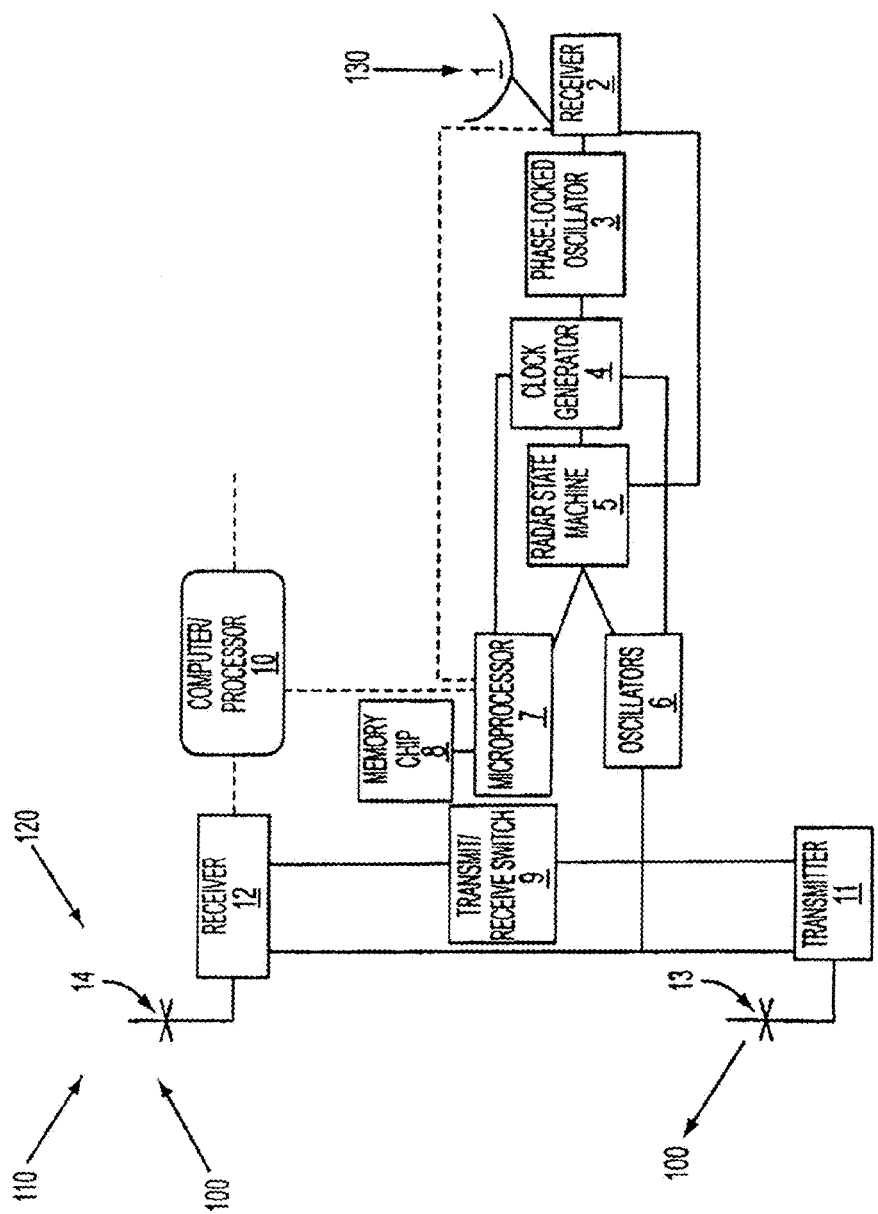
FIG. 1 is a simplified diagram of a radar site configured for tsunami detection according to a particular class of implementations.

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes systems for effective tsunami detection and warning using coastal high frequency (HF) radars. Many national networks of coastal HF radars already exist, primarily for the real-time mapping of ocean surface currents. We describe configurations of these radars that are able to detect and warn of an approaching tsunami in the system's "near field," i.e., the near-shore region over which the radars observe the sea surface. In contrast with the DART™ tsunami warning systems that observe and forecast the height of the tsunami wave in the deep ocean basins, HF radars do not observe the tsunami wave's height, but instead observe a more sensitive indicator: its orbital velocity as it moves into shallow waters close to shore.

The tsunami's orbital velocity becomes part of the surface current as the wave of typically 10-50 minutes period approaches the coast. However, the normal background flows, as well as external atmospheric noise and radio interference can mask the tsunami pattern, potentially producing unacceptable false-alarm rates. Systems enabled by the present disclosure separate the signal representing the tsunami's orbital velocity from these background masking effects and accurately detect tsunamis in the near field of coastal HF radar.

High frequency (HF) radars were first used in the 1960's. Located on the coast and transmitting vertical polarization, they exploit the high conductivity of sea water to propagate their signals—in a surface-wave mode—well beyond the visible or microwave-radar horizon. They have found widespread use for mapping surface currents and monitoring sea state (e.g., wave heights). The radar echo comes from the well-known Bragg scatter by ocean waves half the radar wavelength, traveling toward and away from the radar. See, for example, *Sea backscatter at HF: Interpretation and utilization of the echo,* Barrick, D. E., J. M. Headrick, R. W. Bogle, and D. D. Crombie, *Proc. IEEE,* vol. 62, no. 6, pp. 673-680 (1974), the entire disclosure of which is incorporated herein by reference for all purposes.

Barrick postulated in 1979 that HF radars could detect a tsunami by means of its orbital wave velocity as it approached the coast. See *A Coastal Radar System for Tsunami Warning,* Barrick, D. E., Remote Sensing of Environment, Vol. 8, 353-358 (1979), the entire disclosure of which is incorporated herein by reference for all purposes. However, because the distribution of HF radars around the world was sparse until the 1990s, there was no opportunity to validate this concept and develop the software to overcome the many challenges that are encountered. This began to change after the 2004 Indonesian tsunami, and by the 2011 Tohoku Japan tsunami, there were sufficient radars in place to capture the raw data necessary for the development of algorithms to provide robust detection and warning.

The quantitative metrics typically used by warning centers to decide system effectiveness—and hence utility—are: Probability of detection, Pd, and false-alarm probability, Pfa (sometimes referred to as false-positive probability). As discussed in greater detail below, a particular class of implementations employs the "q-factor" tsunami pattern recognition algorithm, where ideally a q-factor alert is sent only if a tsunami has been observed. This is based on the q-factor trigger exceeding a preset threshold. The tradeoff is this: if the threshold is set too high, the tsunami is not seen (i.e., Pd is unacceptably low). On the other hand, if the threshold is too low, tsunamis are detected (i.e., Pd is acceptable), but Pfa is too high, meaning too many false alarms are seen. Since a tsunami is a rare occurrence, one false alarm per day would certainly be considered too high, and system output alerts would tend to be ignored.

The threshold and filtering parameters that determine Pd and Pfa depend on several factors. These include sometimes intense and/or complex background current patterns that overlay any tsunami pattern; varying external noise and man-made radio interference; and echoes from other non-tsunami targets (e.g., ships, the ionosphere). The tsunami's orbital velocity magnitude depends very much on water depth. A shallow continental shelf that extends out far allows longer warning times, as velocity depends roughly on depth to the inverse three-quarters power. A tsunami's detectability also depends on its intensity. The impact of each of these factors on ultimate detection robustness (high Pd and low Pfa) is discussed in more detail below. As will become apparent, implementations enabled by the present disclosure provide HF-radar-based tsunami detection systems that operate according to performance metrics—Pd and Pfa—that are applicable for the geographic region in which they are deployed.

Also described herein is a numerical near-field tsunami model employed in conjunction with such HF radar detection systems that enable the accurate prediction of tsunami wave height and time of arrival at the coast based on the initial detection. As will be appreciated, such information, which cannot be reliably generated by previous detection systems, is of critical importance to averting the most catastrophic consequences of tsunami landfall.

HF refers to the range of radio frequency electromagnetic waves (radio waves) between 3 and 30 MHz. It should be noted that, while examples described herein refer to HF radar systems, implementations are contemplated that employ radar systems operating in other frequency ranges such as, for example, MF or medium frequency (i.e., 300 kHz to 3 MHz), and VHF or very high frequency (i.e., 30 MHz to 300 MHz). References to the HF range should therefore not be used to unduly limit the scope of the invention.

FIG. 1 shows a simplified diagram of one instance of a coastal HF radar site configured to detect tsunamis as described herein. Only one of the multiple instances typically operating together is shown for clarity. Two of the three signals 100, 110, and 120 received by receiver 12 represent signals generated by the transmitters of the associated sites. Signals 130 from a constellation of GPS satellites impinge on the GPS antenna 1, and are passed to GPS receiver 2. GPS receiver 2 is designed specifically to extract time information from the GPS signals, in contrast with the far more common positional information of conventional GPS receivers.

GPS receiver 2 generates a very stable 10 MHz clock signal that passes into a phased-locked oscillator (PLO) 3 which acts as a low-pass filter, increasing the time positional accuracy of the clock signal by orders of magnitude. GPS receiver also generates a very stable one-pulse-per-second data stream that is fed to the radar state machine 5. The 10 MHz signal fed to the phase-locked oscillator 3, is converted to a 120 MHz timing signal that is used for generation of the radar carrier and other internal frequencies. This 120 MHz reference signal is passed to the clock generator 4. It divides the reference signal down to generate a number of other reference frequencies needed by other devices including a 12 MHz signal fed to microprocessor 7; a 40 MHz signal fed to the radar state machine 5; and a 60 or 120 MHz signal that is passed to a direct signal synthesizer (DSS) and its oscillators 6.

The radar state machine 5 instructs the radar what to do versus time. For example, it generates signals that turn on and off the transmitter output and receiver input signals, so that they are not on at the same time. It also turns on and off switches or gates that suppress transmit or receive signals at various points in the system when they are not wanted. Radar state machine 5 also determines the start and end of the linear frequency sweep modulation. Different sweep start times in different radars that are synchronized via the common GPS timing separate the local sea-echo information from each so that they do not interfere with each other.

Microprocessor 7 (supported by memory chip 8) is the interface to computing device 10 that allows a human operator to control the radar, and processes the received echo signals in real time. Microprocessor 7 also communicates with GPS receiver 2, and transmit/receive (T/R) switch 9. The latter turns on and off various channels in radar transmitter 11 and receiver 12 that suppress their signals at the appropriate times during the pulsing cycle.

The radio-frequency (RF) signals transmitted by transmitter 11 are generated in DSS block 6. These signals contain the sweep and pulse modulations. The sweep span in frequency, sweep repetition interval, pulse and blank periods, and the carrier frequency are all digitally represented and generated, ensuring that each periodic repetition of the waveform is substantially identical to previous cycles. This has the effect of shifting spurs and other waveform imperfections to DC (the zero-Doppler spectral position), so as not to interfere with the Doppler-shifted sea echo information. Carrier frequencies between 0 and 75 MHz are generated by the system via DDS block 6 the output signals of which are provided to transmitter 11, and radiated through transmit antenna 13. Replicas of these signals, along with their quadrature versions, are mixed in the receiver 12, with the incoming echo, noise, and other radar signals that enter its antenna system 14.

The linear frequency modulation sweep start times of multiple radar transmitters operating on the same carrier frequency are synchronized using the same GPS common timing signal, starting at precisely designated but slightly different times. The start times depend on the radar site geometries with respect to each other.

In addition to its capabilities relating to the mapping of surface currents and the monitoring of sea state, the HF radar system depicted in FIG. 1 may be configured in two modes of operation relating to tsunami detection; a simulator mode of operation run at each candidate site before online operations have begun, and an online mode of operation which monitors for tsunamis and passes warning alerts to a warning center for action. In the simulator mode of operation, a determination may be made as to whether a candidate HF radar site (with its characteristic bathymetry, background currents, and noise) is suitable as a tsunami warning system site. In addition, after a site has been selected, the simulator mode of operation may be used to obtain a database of information that may then be used to set parameters to ensure reliable performance of the system when it goes online.

Figure 2:
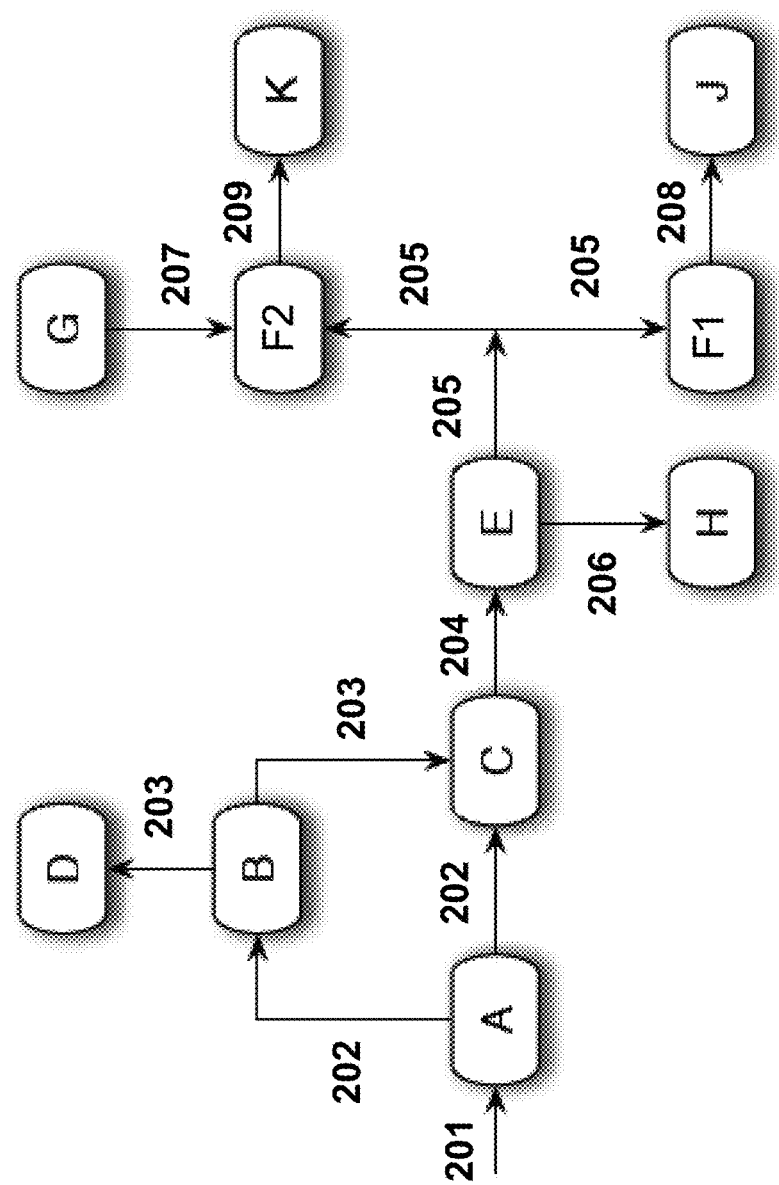
FIG. 2 illustrates a particular implementation of a simulator mode of operation of a radar system configured for tsunami detection.
Figure 3:
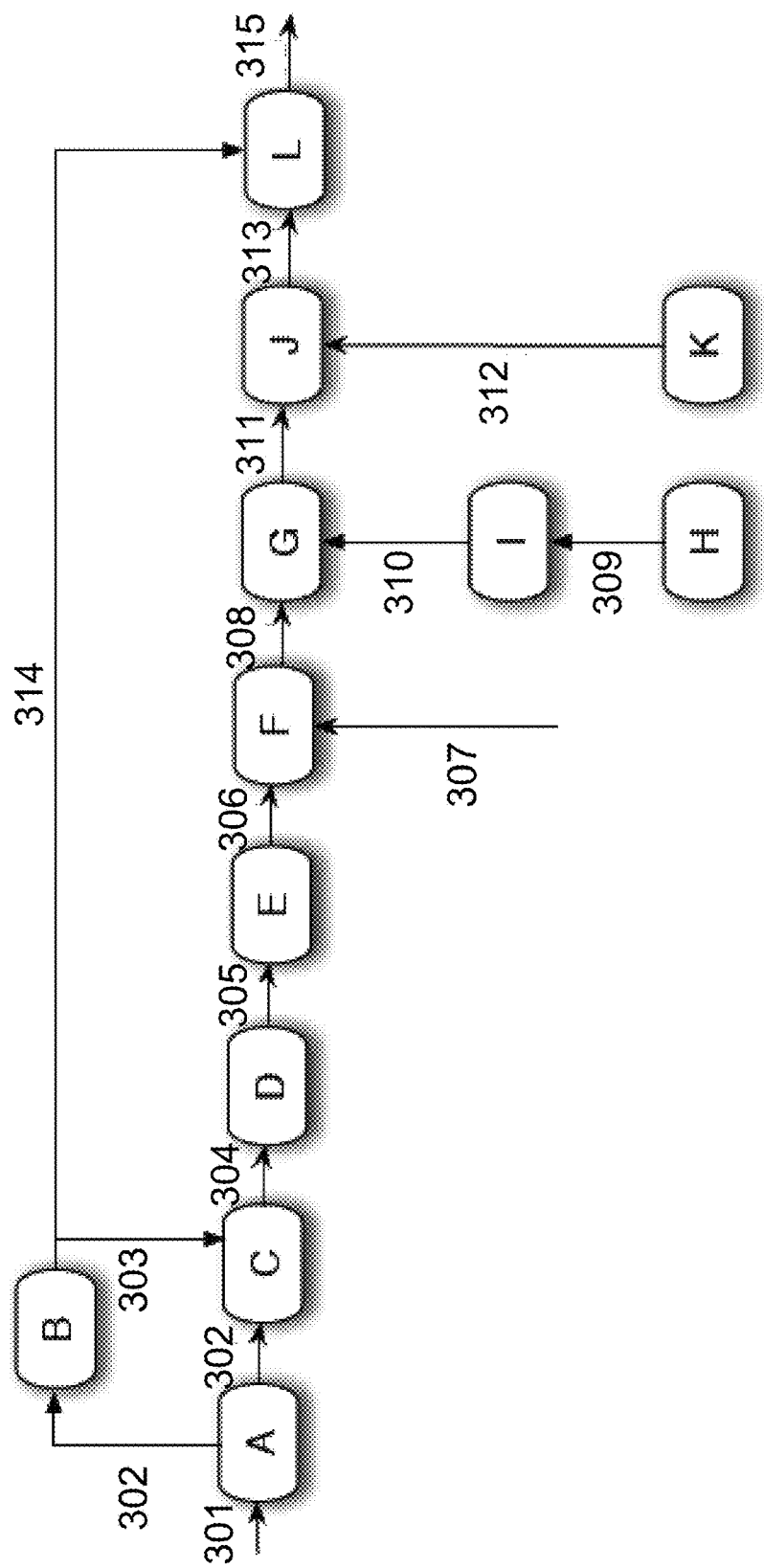
FIG. 3 illustrates a particular implementation of an online mode of operation of a radar system configured for tsunami detection.

FIG. 2 illustrates the algorithmic flow of a particular implementation of an HF radar system configured in a simulator mode of operation. FIG. 3 illustrates the algorithmic flow of a particular implementation of an HF radar system configured in an online mode of operation. Both figures illustrate the flow of digital signals from the radar receiver output through subsequent processing steps, with the ultimate goal of robust tsunami alert information being passed along to a tsunami warning center for disposition. As will be appreciated, the computer program instructions representing this algorithmic flows may be stored on and used to control operation of computing device 10 or another related computing device.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. Suitable alternatives known to those of skill in the art may be employed.

The processing steps depicted in FIGS. 2 and 3 relate to a number of phenomena that are taken into account to ensure reliable system performance. For example, variable external background interference and/or noise is a factor that significantly affects tsunami detection and may give rise to false alarms if the detection threshold is too low. Even very sporadic interference (e.g., once every several days) can give rise to a false positive with the q-factor pattern-recognition algorithm employed by some implementations. But one false alarm per week is usually deemed undesirable. Therefore, various implementations include methods to detect the presence of such interference, along with filtering where possible to remove it. If it cannot be removed, then passing along a disclaimer with any q-factor alerts during high interference periods may inform the warning-center manager's decision regarding how to respond.

In another example, the real-time currents that have long been reported by coastal HF radars vary with location and time. Temporal variations may either be predictable (e.g., tides) or unpredictable (due to many causes, such as storms). Their patterns within the radar coverage where tsunami detection is desired can be quite complex. In a few cases— and even with the best mitigation methods—these background flow variations can be mistaken for a tsunami and hence produce an alert from the recognition algorithm. An effective way to handle this for a given site is to study the background currents and how the detection algorithm responds to them over a several-month period. Simulation techniques are described that accomplish this and mitigate the impact of this and other background factors.

In another example, and unlike noise/interference discussed above (which originates from other sources and is present even in the absence of the transmitted signal), echoes from targets such as ships or from the moving ionosphere overhead admit the possibility of being confused as tsunami echoes if they drift into or near the Bragg sea-echo peak. Techniques are described for detecting and filtering to remove such spurious echoes.

In another example, the depth of water offshore (bathymetry) has a strong influence on tsunami detectability by an HF radar system. This phenomenon is, of course, highly dependent on the radar site. Techniques are described for simulating this phenomenon using numerical models for near-field tsunami propagation based on the local bathymetry. The results of these simulations are then used to guide in the selection of detectability thresholds and other parameters.

Another example relates to the fact that false alarms at any point in the processing stream may be considered to be random events. This means that known information from other sources might be useful in identifying real detections and eliminating spurious events from further consideration. A time window is established around a candidate alert and, if an event from an independent, confirmatory source occurs within this time window, the likelihood that the alert is a true detection is much higher, and it gets passed along to the next stage. Since the purpose of such correlation windows/filters is to eliminate false alarms, this behavior can be evaluated for several months on any new system on which the software is installed. The assumption is that a real tsunami that would trigger an alert is extremely rare, and unlikely to occur during this learning phase. Therefore all candidate alerts that exceed a threshold may be considered to be false alarms. Then, after several months of adjusting system parameters to minimize false alarms, simulated tsunami signals of a given amplitude—based on the near-field tsunami model—may be injected into this data stream to assess its probability of detection.

In another example, a credibility level assessment may be made in real time to assess the detectability of a tsunami of a given amplitude at the radar area and for that time period based on current conditions. This allows for the adjustment of an alert warning signal priority based on changing background conditions. For example, an alert at one time could be a credible tsunami indicator, whereas later it might not because of higher interference. At least some of the factors that impact the credibility of an alert are mentioned above.

Referring now to FIG. 2, a simulator mode of system operation will be described in which the performance and/or suitability of a HF radar site for tsunami detection is evaluated. This involves running the process depicted in FIG. 2 on the site radar (e.g., for several months) to assess its performance against local background limitations. As discussed above, an important characteristic of the site during this phase is the bathymetry of the coastal region of the site as this affects detectability and warning time. The results of the simulator mode of operation allow for the optimization of detectability thresholds and other parameters for the online mode of operation illustrated in FIG. 3.

As will be appreciated by those of skill in the art, some of the blocks of FIG. 2 represent processing steps that are not unique to tsunami detection but are included for completeness. These include, for example, Block A which represents the conventional extraction of Doppler spectra vs. range. From these spectra, the processing represented by Block B searches for both radio interference and natural noise. Natural noise is normally "flat" vs. Doppler frequency and range; sometimes and in some locations it is higher. It is important to catalog this, especially near the Bragg echo peaks within which tsunamis are to be detected. Radio interference, however, has a unique appearance, often as intense bands or peaks in range and Doppler frequency. Again, appearance of such interference bands that cross over or lie parallel but close to the Bragg peaks is problematic. How often they occur and time of day is logged into databases. Radio interference often occurs only at certain times of day/night.

Block A represents a conventional calculation of signal Doppler spectra and/or cross-spectra (202) from each antenna of the HF radar system. Input to this block are the digital time series signals (201) from each receiver. For tsunami observations, one successful implementation generates spectral output samples at intervals of two minutes for outputs, with four minutes for the length of the time series going into each spectral calculation (i.e., two-minute overlapping). As will be appreciated by those of skill in the art, these output times are shorter than those used for conventional current mapping. The calculation of signal Doppler spectra and/or cross-spectra is described in U.S. Pat. No. 5,361,072 for Gated FMCW DF radar and signal processing for range/doppler/angle determination issued on Nov. 1, 1994, the entire disclosure of which is incorporated herein by reference for all purposes.

Block B represents the extraction and analysis of external background signals (203) from the Doppler spectra calculated in Block A. First, it calculates the flat (average) noise level vs. spectral frequency and radar range. Next, it identifies the presence of any man-made radio interference that could obscure the Bragg-peak regions used for tsunami detection; this may include the levels of the interference with respect to the average noise level. If these interference bands pass through the Bragg-echo regions, they can give rise to false alarms in tsunami pattern recognition.

Block C represents the identification and removal of some types of interference from the radar echo spectra in order to avoid false alarms. Examples of such types of interference include: (i) Doppler stripes that occur over many ranges; and (ii) short-time impulsive interference. Stripes or bands that appear at constant Doppler spectral frequency but multiple adjacent ranges are flagged because these can often be removed, unmasking Bragg tsunami echoes underneath. Otherwise in normal warning operations, interference peaks—when they can be identified in the Bragg region—indicate that the candidate q-factor data for this echo range and time period should not be passed along to the tsunami-warning center; at least not without flags indicating the likelihood that these are false alarms. Block C also includes storage and removal (where appropriate) of current signals that can overlay tsunami flows such as, for example, known tidal signals. Such tidal signals represent tidal currents due to the gravitational effects of the sun and the moon that vary with location within the radar coverage area. For further information regarding such tidal signal, please refer to *Classical tidal harmonic analysis including error estimates in MATLAB using T_TIDE,* Pawlowicz R, Beardsley B, Lentz S, Comput. Geosci. 28:929-937 (2002), the entire disclosure of which is incorporated herein by reference for all purposes. Collectively, these functions are considered "preconditioning" of the signal before tsunami detection. The preconditioned Bragg echoes (204) contain currents and tsunami velocities.

Block D represents archiving of information about the noise and interference (203) being seen. This information is used with subsequent correlations with alarms and simulated tsunami detections in order to assess tsunami warning performance at the site when subjected to interference of this type. That is, during the simulator mode of operation when tsunamis are not present, interference bands are archived for later correlation (Block J) with false-alarm peaks (Block F1). Many occurrences with high correlations characterize the robustness and credibility of the site for operational tsunami warning; this determines expected Pfa based on prevalence of radio interference.

Block E represents extraction of the Bragg-peak spectral echoes (205) after preconditioning by the preceding blocks. The Bragg peaks contain both normal background flows (that are typically the primary purpose of these coastal radars) and any tsunami signals. These flows are extracted from the Bragg peaks as vector maps in polar coordinates, and are called "radials." One example from many of the manner in which this flow extraction may be achieved is described in *Least-Squares Methods for the Extraction of Surface Currents from CODAR Crossed-Loop Data: Application at ARSLOE,* Lipa, B. J and D. E. Barrick, IEE Journal of Oceanic Engineering, Vol. 8, 1-28 (1983), the entire disclosure of which is incorporated herein by reference for all purposes.

Blocks F1 and F2 represents tsunami pattern recognition. According to a particular implementation, tsunami pattern recognition is performed according to the algorithm described in *Tsunami Arrival Detection with High Frequency (HF) Radar,* Lipa, B., J. Isaacson, B. Nyden, and D. Barrick, Remote Sensing, Vol. 4, 1448-1461 (2012), the entire disclosure of which is incorporated herein by reference for all purposes. It will be understood, however, that implementations are contemplated in which other pattern recognition algorithms may be used. According to some implementations, pattern recognition operates on the radial velocity outputs produced by Block E at regular intervals, e.g., every two minutes. See also the description below of Block E of FIG. 3 for further details regarding a specific approach to pattern recognition.

Block F1 represents the operation of the tsunami recognition algorithm using real-time background currents but where there are no injected tsunami signals. This allows for the cataloging of q-factor alerts (for given threshold levels) (208) that are produced at that site in the absence of a tsunami; providing a baseline for the false alarm rate. Block F2 uses the same real-time background currents but injects test tsunami signals (207) of a chosen amplitude and start time. This allows for the evaluation of detection probability for the baseline false alarm rate represented by Block F1.

Block G represents the injection of a tsunami signal (207) based on a numerical model that takes into account offshore bathymetry and tsunami intensity at the outer edge of the local "near field." The model propagates the simulated tsunami wave (both orbital velocity as well as height) toward the coast, through the bands parallel to shore. The numerical near-field model provides a database for the relations between tsunami orbital velocity seen at any distance from shore (within radar coverage) and (i) time of arrival at the coast; (ii) increase in orbital velocity with decreasing distance from shore; (iii) height of the tsunami with distance from shore. It is based the changing bathymetry (depth) across the continental shelf. This allows the system operator to study tsunami detection probability in Block F2 for varying tsunami intensities in relation to the actual background flows from that site. That is, the pattern recognition algorithm (Block F2) generate alarms (209) for both the tsunami imposed on top of background currents as well as noise at the site so that both detections as well as known false alarms are known.

Block H represents the archiving of the radial current map patterns (206) for the site over the evaluation/simulation phase (which might last several months). This information may be used with correlations with q-factor false alarms and simulated tsunami detections in order to assess tsunami warning performance at the site based on the nature of the underlying background current.

Block J represents archiving for study and evaluation the false alarms (208) for the site under real-time background noise/interference and currents. Correlations of false alarm rates and occurrences with these other factors may then be performed and assessed.

Block K represents archiving for study and evaluation the detectability of the injected tsunami for the site under real-time background/interference and currents. Correlation of detection probability with these other factors may then be performed and assessed. This allows for the compilation of statistics of Pfa (based on real radar background data) along with accompanying Pd (based on a known, injected realistic tsunami signal), so that these performance metrics can be used to evaluate the site's suitability and performance for operational real-time tsunami detection and warning, as well as the appropriate parameters (e.g., q-factor threshold) for the online operation at that site.

Referring now to FIG. 3, an online mode of operation of a radar system configured for tsunami detection will be described. According to a particular class of implementations, the depicted processing steps are intended to be performed in parallel with the software on the radar system that provides real-time current maps, sea state, and perhaps ship detections—without hindering or interfering with those functions. As discussed above, a variety of extraneous factors can impede robust detection of tsunamis by coastal HF radars. These include external radio interference and noise; complex, variable background current patterns underlying the tsunami velocities; and echoes from other targets (e.g., vessels, the ionosphere). Furthermore, offshore bathymetry and limited receiver dynamic range also affect detectability. The process illustrated in FIG. 3 enables detection of a tsunami pattern within the natural background; dealing with these challenges, in order to produce credible, useful warnings to tsunami warning centers.

Block A represents the conventional calculation of signal Doppler spectra and/or cross-spectra (302) from the digital time series signals (301) of each antenna in the coastal HF radar system in which the detection system is installed. This is the normal extraction of Doppler spectra after digitization in the receiver and is not unique to tsunami detection. Block B represents the extraction and analysis of the external background signals (303) from the Doppler spectra calculated in Block A. The processing of Block B involves the extraction of noise and the identification of man-made radio interference, if present. See the descriptions of Blocks A and B, respectively, of FIG. 2.

Block C represents the identification and removal of some types of interference from the radar echo spectra before attempting to detect tsunamis in order to avoid false alarms. This involves the preconditioning of the digitized receiver output by removing known interference (when possible) and tidal currents (if necessary) (304). The former may done by excising any short-term impulsive noise, where present (e.g., lightning bursts), and/or using negative range cells to remove interference band stripes from positive-range data near Bragg peaks, where appropriate. See, for example, U.S. patent application Ser. No. 14/213,841 entitled Negative Pseudo-Range Processing with Multi-static FMCW Radars filed on Mar. 14, 2014, the entire disclosure of which is incorporated herein by reference for all purposes. Such interference is known to be a source of tsunami false alarms. If it cannot be removed, alerts may be flagged as suspect to a tsunami warning center. See the description of Block C of FIG. 2.

Block D represents the extraction of the Bragg peak spectral echoes (305) (which contain currents and any tsunami signals) after preconditioning by the preceding blocks. See the description of Block E of FIG. 2.

Block E of FIG. 2 represents tsunami pattern recognition and generation of corresponding alerts (306). As discussed above with reference to Blocks F1 and F2 of FIG. 2, and according to a particular implementation, tsunami pattern recognition represented by Block E of FIG. 3 is performed according to the algorithm described in Tsunami Arrival Detection with High Frequency (HF) Radar, Lipa, B., J. Isaacson, B. Nyden, and D. Barrick, Remote Sensing, Vol. 4, 1448-1461 (2012), the entire disclosure of which is incorporated herein by reference for all purposes. It will be understood, however, that implementations are contemplated in which other pattern recognition algorithms may be used.

According to the depicted implementation, the radial velocity current maps generated by Block D are resolved into roughly rectangular bands parallel to shore (i.e., the isobaths). For each band going out from the coast, there is a perpendicular and parallel flow component. To recognize a tsunami pattern within the background flow, its typical known spectral properties are exploited (e.g., tsunami periods are typically in the range of about 10-50 minutes). Within each band, it is determined whether the velocity increases or decreases by an amount greater than a preset level over two consecutive time intervals. If it increases or decreases a q-level parameter is incremented or decremented, respectively, for that band. It is then determined whether the maximum/minimum velocities for consecutive bands coincide (within a preset value) for consecutive time intervals. If so, the q-level parameter for that band and time is increased (where the maximum velocities coincide) or decreased (where the minimum velocities coincide). It is then determined whether the velocity increases or decreases over two consecutive time intervals for three adjacent area bands. If there is an increase, the q-level parameter is incremented; if a decrease, it is decremented.

Figure 4:
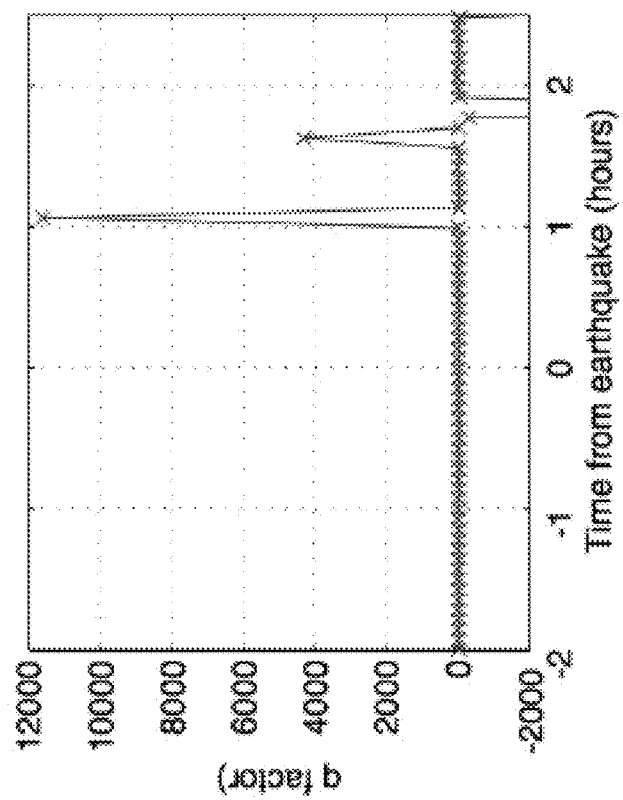
FIG. 4 illustrates the output of a tsunami detection algorithm employed by a particular implementation.
Figure 4:
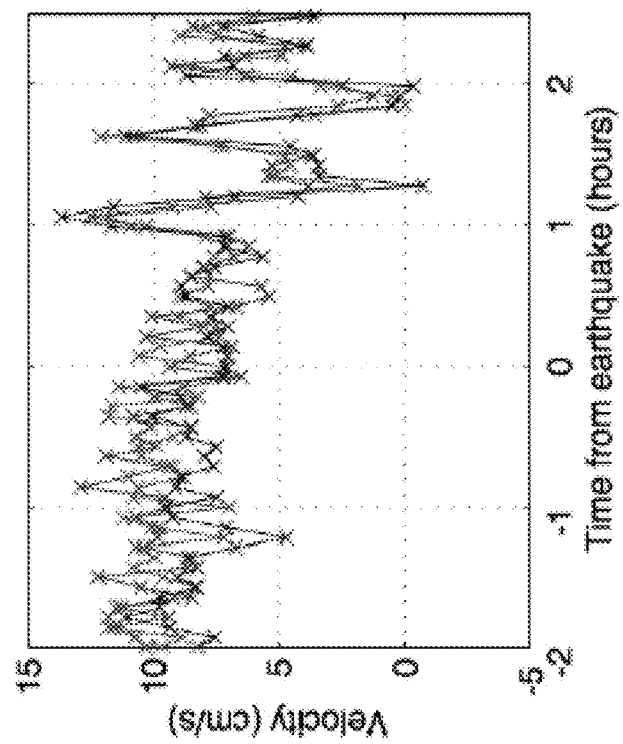

FIG. 4 shows a representation of the actual output of an implementation of the q-factor algorithm summarized above, that successfully detected the Tohoku, Japan tsunami of March 2011. The panel on the right shows how the alert peaks have identified and detected the strong tsunami velocities (on the left), between 6-12 km from the coast (i.e., the distance along a line roughly perpendicular to the depth contours in the near-field region as determined from the velocities and the time of the earthquake). By themselves, the velocities as contaminated by noise and background tides, would have been difficult to resolve without this pattern-recognition algorithm. As shown in the figure, the empirically established q-factor tsunami pattern recognizer precisely identifies the first tsunami peak (as confirmed by coastal tide gages). Nonetheless, over many hours and days, too many false alarms can arise due to extraneous background effects. The additional processing described herein, during both modes of operation serve to reduce the likelihood of such false alarms while enhancing the probability of accurate detection.

Referring again to FIG. 3, Block F represents one way in which at least some false alarms may be eliminated from among the alerts generated by tsunami pattern recognition of Block E. This is done by examining q-factor outputs (307) from adjacent HF radars. A real tsunami should be seen at two coastal locations 30 km apart, for example, within a definable time window (e.g., a 10-30 minutes). Tsunami waves refract as they move into the ever-shallower water of the continental shelf near the coast. This means they tend to arrive perpendicular to the shore. This forces similar arrival times at locations along a nearly straight coastline over these short distances. Hence, if a high q-factor peak at Radar M arrives at a given range within 15 minutes of a high q-factor peak at Radar N, the presence of both raises the probability that a real tsunami is being seen by orders of magnitude and the alert (308) is passed along. Likewise, if a high q-factor at Radar M has no counterpart at Radar N, this raises greatly the probability that the "alert" spike was in fact a false alarm. Thus, the solitary alert can either be eliminated as a false alarm, or a flag attached to the alert (308) that gives it a much lower credibility. This allows for options by personnel at a tsunami warning center when evaluating and comparing with other information to decide on a course of action.

Block G represents another way in which false alarms may be eliminated. At present, several services provide apps that distribute online notifications (309) within two minutes of an earthquake that has occurred anywhere in the world (and in some cases much sooner). One example of such a service is http://www.sms-tsunami-warning.com/. These services typically provide the latitude, longitude, time, and magnitude of the earthquake. Such an information source is represented in FIG. 3 as Block H.

Even though not all subsea earthquakes generate tsunamis, the assumption here is that any subsea earthquake with magnitude higher than 5 can be an origin for a tsunami. An algorithm (represented by Block I) based on the depth profile between the earthquake origin and the radar near-field of interest is used to calculate an expected arrival time (310) of a tsunami generated by the detected earthquake. This is based on the simple equation for tsunami phase-velocity vs. depth. The algorithm predicts when the radar will be able to detect the tsunami based on the time and location of the earthquake. This does not necessarily need to be a full partial differential equation (PDE) numerical model in order to define a suitable window (e.g., ±30 minutes) at the radar. For example, if ΔT is defined as the time interval between the known earthquake occurrence and the time to reach the edge of the near-field radar coverage area, then a simple but adequate estimate of this is given by:

$$\Delta T = \int_{x_S}^{x_E} \frac{dx}{\sqrt{gd(x)}} \tag{1}$$

where x is the path length along the great circle between start and end points, $X_S$, $X_E$; g is the known acceleration of gravity; and d(x) is a smoothed version of the depth along the great-circle path the tsunami must traverse to reach the radar area. It should be noted that, while this is a simplified calculation, it is sufficient to achieve ±half-hour accuracy in arrival time. The denominator within the integrand is the accepted propagation velocity of a tsunami wave based on water depth. More accurate models are available, so it should be understood that the above example is meant to describe one approach, but not to exclude alternative calculations.

A threat window is then set up for Block G (e.g., ±0.5 hour of the arrival time) and any q-factor alert candidates within this window (311) are given high priority and passed along for further processing. Conversely, a q-factor alert exceeding an alert threshold that was not preceded by a subsea earthquake (or equivalent event) may be eliminated (at the discretion of the warning center manager). It should be noted that, although earthquakes are described as an origin of tsunamis, other origins are known such as, for example, subsea landslides and fast-moving atmospheric anomalies that produce "meteo-tsunamis." Timely warnings for both of these types of events are also available online and may therefore be used in a similar manner to define time windows at a radar for enhanced alert credibility. Again, the purpose is to flag more credible q-factor alerts and downgrade others that are not accompanied by a source warning. It should also be noted that only a fraction of subsea earthquakes or atmospheric anomalies produce measurable tsunamis. As such, alerts of such events do not mean a tsunami will be seen by the radar; merely that it may be advisable to establish a "watch" in order to raise HF radar robustness and credibility by increasing detection probability and reducing false alarms.

Block K represents the numerical near-field model (312) that provides a database for the relations between tsunami orbital velocity seen at any distance from shore (within radar coverage) and (i) time of arrival at the coast; (ii) increase in orbital velocity with decreasing distance from shore; (iii) height of the tsunami with distance from shore. It is based the changing bathymetry (depth) across the continental shelf. This information is used by the processing represented by Block J to forecast the height, water orbital velocity, and arrival time at the coast (313) from the point and time of detection; the latter being derived from the q-factor alert(s).

According to a particular implementation, the equations representing shallow-water tsunami wave propagation (Block K) are given by:

$$\nabla \eta(x, y, t) = -\frac{1}{g} \frac{\partial \tilde{v}(x, y, t)}{\partial t} \tag{2}$$

and $$\nabla \cdot [(d(x, y) + \eta(x, y, t))\tilde{v}(x, y, t)] = -\frac{\partial \eta(x, y, t)}{\partial t} \tag{3}$$

Equation (2) expresses Newton's second law, which is also a dominant term in the famous Navier-Stokes of hydrodynamics. Equation (3) expresses the incompressibility of water, a well-established relation. Here, η(x,y,t) is the height of the tsunami wave, as a function of horizontal distances and time; and ṽ(x,y,t) is the horizontal water orbital velocity vector, also a function of horizontal distances and time. Tsunami orbital velocity is taken to be depth independent here, as in all conventional modeling treatments.

Equations (2) and (3), being functions of two unknowns (height and velocity), can be solved to get single second-order partial differential equations (PDE) in each of these two tsunami variables (neglecting the height inside the square braces of the second equation because it is small), to arrive at:

$$\nabla \nabla \cdot (d\tilde{v}) - \frac{1}{g} \frac{\partial^2 \tilde{v}}{\partial t^2} = \tilde{0} \tag{4}$$

and $$\nabla \cdot (d\nabla \eta) - \frac{1}{g} \frac{\partial^2 \eta}{\partial t^2} = 0 \tag{5}$$

Equations (4) and (5) are applied over the "near-field" region within the radar coverage area; typically out to ~50 km from the coast. They may be solved on personal computing devices with conventional, commercially-available packages like MATLAB, using the associated PDE toolbox. The offshore bathymetry is included as the depth variable, d(x,y), and the coastline becomes a boundary for the domain. Normally, we find it easier to solve the second PDE, scalar Equation (5) for the tsunami wave height. Then velocity is obtained by integrating the left side of Equation (2). This establishes the relations between orbital velocity (measured by the radar) and tsunami wave height desired by the warning centers, as well as time of arrival at the coast from any point in the near-field region.

As will be appreciated, these equations might be solved only once, and normalized results stored in a database or spreadsheet. The velocities corresponding to a q-factor alert allow identification of a database table entry from which one can extract the accompanying tsunami wave height as a function of distance from shore. The time of arrival at the coast may also be extracted from these modeled results based on the distance and time it was first detected by the radar. These then may accompany the alert information that is passed along to the tsunami-warning center.

Block L represents the final processing step before transmittal of the tsunami alert information (315) to the warning center. The background noise and interference levels (314) from Block B are employed to determine the credibility of any q-factor alerts. For example, if noise is high in a given period, peaks during the period would be lowered in credibility or perhaps eliminated. This may be done by comparison of the orbital velocity at the q-factor alert peak with a visibility threshold based on the noise itself as determined in Block B. Any remaining tsunami alerts are then ready to pass to the tsunami warning center. It should be noted that such radar-based alerts may be correlated with any other information available to the tsunami warning center, and then integrated into suitable displays for action by the center personnel.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A method, comprising:
   receiving Bragg peak information derived from receiver signals of a coastal radar system, the Bragg peak information representing ocean surface currents;
   generating a tsunami alert from the Bragg peak information using tsunami detection logic, the tsunami detection logic being configured to detect patterns corresponding to temporal, spectral, and spatial characteristics of a tsunami; and
   determining credibility of the tsunami alert using time-correlated information from one or more external sources.

2. The method of claim 1, further comprising, based on the credibility of the tsunami alert, performing one of (1) transmitting the tsunami alert to a tsunami warning center, (2) transmitting the tsunami alert to the tsunami warning center with credibility information representing the credibility of the tsunami alert, or (3) ignoring the tsunami alert.

3. The method of claim 1, wherein determining the credibility of the tsunami alert includes correlating the tsunami alert with one or more other tsunami alerts generated by one or more nearby coastal radar systems.

4. The method of claim 1, wherein determining the credibility of the tsunami alert includes correlating the tsunami alert with an arrival time window estimated using one of seismic event information, subsea landslide event information, or atmospheric anomaly event information.

5. The method of claim 4, further comprising calculating the arrival time window in response to the seismic event information, the subsea landslide event information, or the atmospheric anomaly event information.

6. The method of claim 1, wherein determining the credibility of the tsunami alert is done with reference to a complexity of the ocean surface currents as determined from the Bragg peak information.

7. The method of claim 1, further comprising, in response to the tsunami alert, estimating a height and an arrival time using a numerical model for near-field tsunami propagation based on offshore bathymetry for the coastal radar system.

8. The method of claim 1, wherein generating the tsunami alert from the Bragg peak information includes:
   resolving radial current information derived from the Bragg peak information into a plurality of substantially rectangular bands substantially parallel to a shoreline adjacent the coastal radar system, each of the bands being characterized by a perpendicular flow component and a parallel flow component;
   for each band:
      determining whether an orbital velocity associated with the band changes by more than a first amount over consecutive time intervals;
      determining whether the orbital velocity associated with the band is within a second amount of the orbital velocity of an adjacent band; and
      determining whether the orbital velocities associated with multiple adjacent bands including the band all change in a same direction over at least two consecutive time intervals;
   adjusting one or more tsunami alert values based on the determinations for the bands; and
   generating the tsunami alert if one or more of the tsunami alert values exceeds a threshold.

9. A system, comprising:
   one or more memories; and
   one or more processors configured to:
      receive Bragg peak information derived from receiver signals of a coastal radar system, the Bragg peak information representing ocean surface currents;
      generate a tsunami alert from the Bragg peak information using tsunami detection logic, the tsunami detection logic being configured to detect patterns corresponding to temporal, spectral, and spatial characteristics of a tsunami; and
      determine credibility of the tsunami alert using time-correlated information from one or more external sources.

10. The system of claim 9, wherein the one or more processors are further configured to perform, based on the credibility of the tsunami alert, one of (1) transmitting the tsunami alert to a tsunami warning center, (2) transmitting the tsunami alert to the tsunami warning center with credibility information representing the credibility of the tsunami alert, or (3) ignoring the tsunami alert.

11. The system of claim 9, wherein the one or more processors are configured to determine the credibility of the tsunami alert by correlating the tsunami alert with one or more other tsunami alerts generated by one or more nearby coastal radar systems.

12. The system of claim 9, wherein the one or more processors are configured to determine the credibility of the tsunami alert by correlating the tsunami alert with an arrival time window estimated using one of seismic event information, subsea landslide event information, or atmospheric anomaly event information.

13. The system of claim 12, wherein the one or more processors are further configured to calculate the arrival time window in response to the seismic event information, the subsea landslide event information, or the atmospheric anomaly event information.

14. The system of claim 9, wherein the one or more processors are configured to determine the credibility of the tsunami alert with reference to a complexity of the ocean surface currents as determined from the Bragg peak information.

15. The system of claim 9, wherein the one or more processors are further configured to estimate, in response to the tsunami alert, a height and an arrival time using a numerical model for near-field tsunami propagation based on offshore bathymetry for the coastal radar system.

16. The system of claim 9, wherein the one or more processors are configured to generate the tsunami alert from the Bragg peak information by:
resolving radial current information derived from the Bragg peak information into a plurality of substantially rectangular bands substantially parallel to a shoreline adjacent the coastal radar system, each of the bands being characterized by a perpendicular flow component and a parallel flow component;
for each band:
determining whether an orbital velocity associated with the band changes by more than a first amount over consecutive time intervals;
determining whether the orbital velocity associated with the band is within a second amount of the orbital velocity of an adjacent band; and
determining whether the orbital velocities associated with multiple adjacent bands including the band all change in a same direction over at least two consecutive time intervals;
adjusting one or more tsunami alert values based on the determinations for the bands; and
generating the tsunami alert if one or more of the tsunami alert values exceeds a threshold.

17. A computer-implemented method, comprising:
receiving receiver signals from one or more receivers of a coastal radar system;
generating Doppler spectra information from the receiver signals;
removing signal interference information from the Doppler spectra information thereby generating preconditioned spectra information;
extracting Bragg peak information from the preconditioned spectra information, the Bragg peak information representing ocean surface currents;
using tsunami detection logic, generating a tsunami alert from the Bragg peak information; and
determining credibility of the tsunami alert using stored correlations between false alert information previously generated by the tsunami detection logic and previously stored signal interference information representative of current conditions of the coastal radar system.

18. The method of claim 17, further comprising, based on the credibility of the tsunami alert, performing one of (1) transmitting the tsunami alert to a tsunami warning center, (2) transmitting the tsunami alert to the tsunami warning center with credibility information representing the credibility of the tsunami alert, or (3) ignoring the tsunami alert.

19. The method of claim 17, further comprising determining the credibility of the tsunami alert by correlating the tsunami alert with one or more other tsunami alerts generated by one or more nearby coastal radar systems.

20. The method of claim 17, further comprising determining the credibility of the tsunami alert by correlating the tsunami alert with an arrival time window estimated using seismic event information.

21. The method of claim 20, further comprising calculating the arrival time window in response to the seismic event information.

22. The method of claim 17, further comprising determining the credibility of the tsunami alert with reference to a strength and a complexity of the ocean surface currents as determined from the Bragg peak information.

23. The method of claim 17, further comprising, in response to the tsunami alert, estimating a height and an arrival time using a numerical model for near-field tsunami propagation based on offshore bathymetry for the coastal radar system.

24. The method of claim 17, wherein generating the tsunami alert from the Bragg peak information includes:
resolving radial current information derived from the Bragg peak information into a plurality of substantially rectangular bands substantially parallel to a shoreline adjacent the coastal radar system, each of the bands being characterized by a perpendicular flow component and a parallel flow component;
for each band:
determining whether an orbital velocity associated with the band changes by more than a first amount over consecutive time intervals;
determining whether the orbital velocity associated with the band is within a second amount of the orbital velocity of an adjacent band; and
determining whether the orbital velocities associated with multiple adjacent bands including the band all change in a same direction over at least two consecutive time intervals;
adjusting one or more tsunami alert values based on the determinations for the bands; and
generating the tsunami alert if one or more of the tsunami alert values exceeds a threshold.

25. A system, comprising:
one or more memories; and
one or more processors configured to:
receive receiver signals from one or more receivers of a coastal radar system;
generate Doppler spectra information from the receiver signals;
remove signal interference information from the Doppler spectra information thereby generating preconditioned spectra information;
extract Bragg peak information from the preconditioned spectra information, the Bragg peak information representing ocean surface currents;
using tsunami detection logic, generate a tsunami alert from the Bragg peak information; and
determine credibility of the tsunami alert using stored correlations between false alert information previously generated by the tsunami detection logic and previously stored signal interference information representative of current conditions of the coastal radar system.

26. The system of claim 25, wherein the one or more processors are further configured to perform, based on the credibility of the tsunami alert, one of (1) transmitting the tsunami alert to a tsunami warning center, (2) transmitting the tsunami alert to the tsunami warning center with credibility information representing the credibility of the tsunami alert, or (3) ignoring the tsunami alert.

27. The system of claim 25, wherein the one or more processors are further configured to determine the credibility of the tsunami alert by correlating the tsunami alert with one or more other tsunami alerts generated by one or more nearby coastal radar systems.

28. The system of claim 25, wherein the one or more processors are further configured to determine the credibility of the tsunami alert by correlating the tsunami alert with an arrival time window estimated using seismic event information.

29. The system of claim 28, wherein the one or more processors are further configured to calculate the arrival time window in response to the seismic event information.

30. The system of claim 25, wherein the one or more processors are further configured to determine the credibility of the tsunami alert with reference to a strength and a complexity of the ocean surface currents as determined from the Bragg peak information.

31. The system of claim 25, wherein the one or more processors are further configured to estimate, in response to the tsunami alert, a height and an arrival time using a numerical model for near-field tsunami propagation based on offshore bathymetry for the coastal radar system.

32. The system of claim 25, wherein the one or more processors are configured to generate the tsunami alert from the Bragg peak information by:
resolving radial current information derived from the Bragg peak information into a plurality of substantially rectangular bands substantially parallel to a shoreline adjacent the coastal radar system, each of the bands being characterized by a perpendicular flow component and a parallel flow component;
for each band:
determining whether an orbital velocity associated with the band changes by more than a first amount over consecutive time intervals;
determining whether the orbital velocity associated with the band is within a second amount of the orbital velocity of an adjacent band; and
determining whether the orbital velocities associated with multiple adjacent bands including the band all change in a same direction over at least two consecutive time intervals;
adjusting one or more tsunami alert values based on the determinations for the bands; and
generating the tsunami alert if one or more of the tsunami alert values exceeds a threshold.

* * * * *